United States Patent [19]

Jackson

[11] Patent Number: 4,602,727
[45] Date of Patent: Jul. 29, 1986

[54] ROTARY FEEDER SYSTEM

[75] Inventor: Carroll V. Jackson, Northbrook, Ill.

[73] Assignee: Wm. W. Meyer & Sons, Inc., Skokie, Ill.

[21] Appl. No.: 610,591

[22] Filed: May 15, 1984

[51] Int. Cl.⁴ ............................................. G01F 11/20
[52] U.S. Cl. .................................... 222/368; 222/410; 277/153
[58] Field of Search ................ 222/344, 367–368, 222/410, 251; 277/152, 153; 414/219

[56] References Cited

U.S. PATENT DOCUMENTS

| | | | |
|---|---|---|---|
| 2,172,325 | 9/1939 | Victor et al. | 277/153 |
| 4,059,205 | 11/1977 | Heyl | 222/368 |
| 4,179,043 | 12/1979 | Fischer | 222/368 |
| 4,238,058 | 12/1980 | Heth | 222/368 |
| 4,258,927 | 3/1981 | Cather, Jr. | 277/152 |
| 4,283,064 | 8/1981 | Staab et al. | 277/152 X |
| 4,316,559 | 2/1982 | McLemore | 222/368 X |
| 4,501,286 | 2/1985 | Rohlfing et al. | 414/219 X |
| 4,511,067 | 4/1985 | Martin et al. | 222/368 X |

FOREIGN PATENT DOCUMENTS 934073  8/1963  United Kingdom ................ 414/219

Primary Examiner—Joseph J. Rolla
Assistant Examiner—Michael S. Huppert
Attorney, Agent, or Firm—Brezina & Buckingham

[57] ABSTRACT

The present invention provides a rotary feeder system having a rotor housing with an intake opening and means for discharging material spaced apart side walls. A rotor is positioned with its radially extending blades disposed within the rotor housing and its two ends of its shaft each extending through an aperture in one of the side walls. The shaft bearing and interconnection to the rotating means are each disposed outwards of the rotor housing and the apertures are sealed about the rotor shaft by a sealing assembly comprising a washer, a seal having a first and second ring wherein the second ring extends inward beyond the inner circumference of the first, said ring merging into a flange pressing upon said washer, and a retaining plate which bears against the second ring, tightening it against the washer. The washer and second ring of the seal are preferably formed of tetrafluoro-ethylene resin, and all joints between components within the rotor housing are welded to fill any crevices. The present invention also provides a rotary feeder wherein the gear shaft of the drive is received in a bore within the rotor shaft and these two shafts are precisely aligned by an alignment pin that is lodged through a bore in these shafts when the bores of the separate shafts are properly aligned, which permits the feeder to be disassembled for cleaning and then reassembled without resetting tolerances.

11 Claims, 4 Drawing Figures

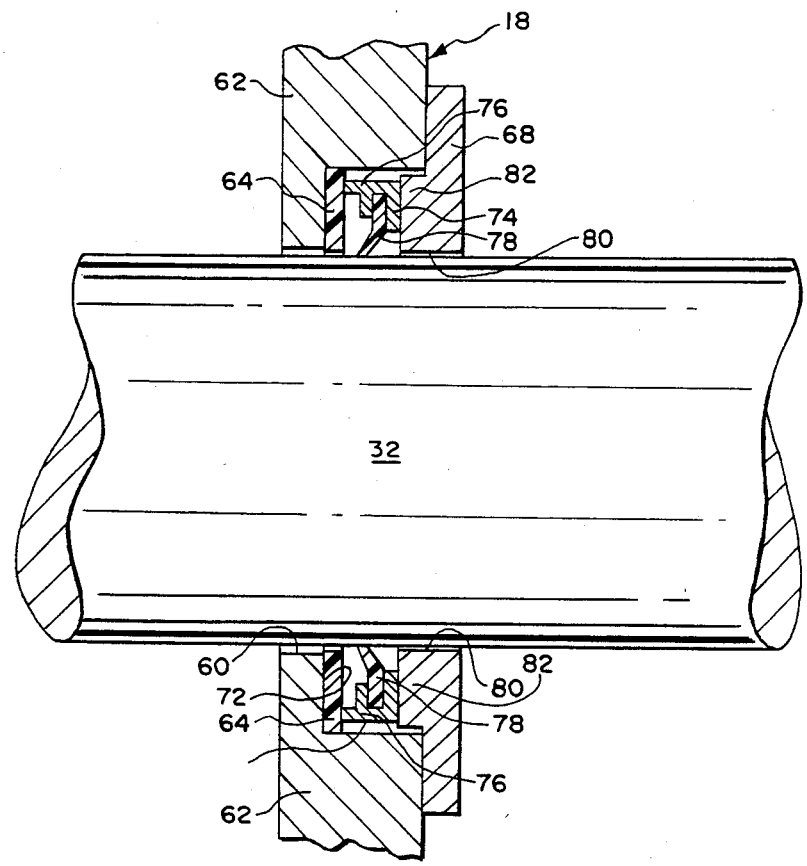

ROTARY FEEDER SYSTEM

TECHNICAL FIELD OF THE INVENTION

The present invention is in the technical field of rotary valves, particularly those considered sanitary rotary valves designed for minimizing or eliminating contamination of materials that pass through the valve. These rotary valves are also referred to in the art as feeders and sanitary feeders.

BACKGROUND OF THE INVENTION

Rotary valves or feeders generally comprise some form of rotor assembly having a plurality of vanes projecting radially from a shaft which vanes control the movement of material as it passes through the feeder. The rotor is enclosed in a housing having an intake mouth operationally open to a supply of the material being handled, which material flows into those pockets formed by adjacent vanes that are disposed facing the intake. Upon rotor rotation, the filled pockets turn to a position at which they are open to a means for discharging the material, such as a bottom discharge opening, and the material is released from the pocket.

In some feeders, the movement of the material both in and out of the pockets is a gravitational effect, the intake mouth being disposed above the rotor assembly and the discharge means being an opening in the bottom of the rotor housing. The material could instead be discharged by blowing it in a horizontal direction into a discharge tube when the filled pocket turns to a position adjacent such discharge tube. In any instance, the feeder is generally disposed in a line, most often a vertical line with the material flow, and regulates the volume of material passing through the line per unit time.

Materials whose flow can be controlled by such a feeder include solid materials of such suitable form, such as powders, small pellets, and the like, that material movement approaches a resemblence to fluid flow.

When the material is intended for ingestion, particularly human ingestion, such as pharmaceuticals and foodstuff, it is desirable, and at times mandatory, that the surfaces of the feeder that come in contact with the material be free of crevices, cracks, pits, and the like, in which the material or other substances could become entrapped, and therein deteriorate, leading to contamination of material passing through the feeder. In certain applications, such as handling of dairy products, the U.S. Department of Agriculture requires rotary feeders to be free of such crevices, cracks, pits and the like, for approval.

It is an object of the present invention to provide a rotary feeder that is not only easy to disassemble for cleaning its internal parts, but also is free from cracks, crevices, pits, and the like within the rotor housing and thus on all material contact surfaces. It is an object of the present invention to provide such a feeder while maintaining the integrity of the feed passage as to the avoidance of entrance of external contaminants. These and other objects will be made apparent by the disclosure of the invention and the description of the preferred embodiments of the invention.

DISCLOSURE OF THE INVENTION

The present invention is a rotary feeder having a rotor normally disposed within a rotor housing having an intake opening and means for discharging material, wherein the bearing surfaces for such rotor are disposed outwards of the housing, and further wherein the rotor shaft, which at both ends extends through apertures in the housing walls, is protected at its exit point by an annular seal assembly, the contact surfaces of which are formed of tetrafluoroethylene resin.

Further, the rotor shaft at one end concentrically receives the end of a gear shaft and is precisely aligned therewith along the shaft's axial line by means of an alignment pin, at a position along its length outwards of the rotor housing, permitting the rotor to easily be precisely positioned within the rotor housing. The feeder assembly thus can easily be reassembled after cleaning.

In preferred embodiment all joints within the rotor housing are welded whereby all crevices, cracks, pits, and the like, normally created by the joinder of two components, are filled and sealed.

BRIEF DESCRIPTION OF THE DRAWINGS

FIG. 3a is an enlarged view of a portion of the rotary feeder of FIG. 1 taken from FIG. 3.

PREFERRED EMBODIMENTS OF THE INVENTION

Figure 1:
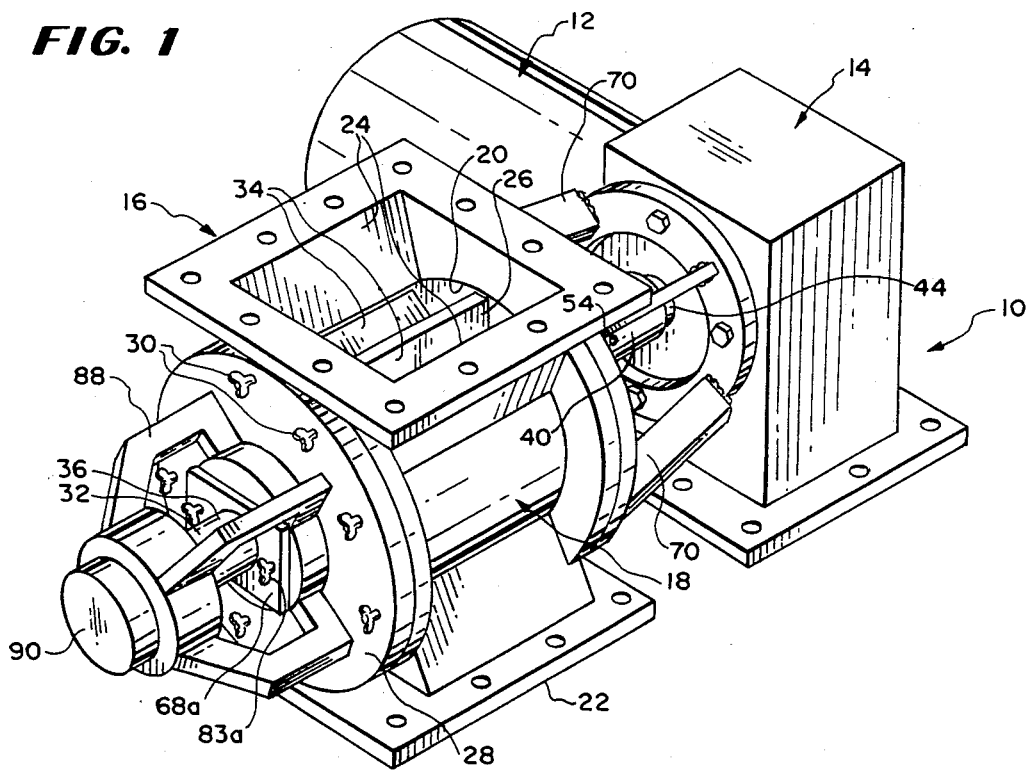
FIG. 1 is a perspective view of a rotary feeder embodying features of the present invention.

In FIG. 1 is shown a rotary feeder system, designated generally by the reference number 10, comprising a motor 12, gear box 14, and rotary feeder 16. The feeder 16, as shown, comprises a rotor housing 18 having a top intake opening 20 and a bottom discharge exit opening 22. The intake opening 20 preferably has a pair of opposed inclined sides 24 forming a two-sided chute which tends to guide the material passing through towards the axial center line of a rotor 26 shown mounted within the housing 18 below the intake opening 20. The exit opening 22 can also be formed with a similar pair of sides (not shown) inwardly inclined towards each other.

The rotor housing 18 is closed at its end opposite the gear box 14, i.e., its forward end 27, with an end plate 28 secured with wing nuts 30 for ease in removal.

Figure 2:
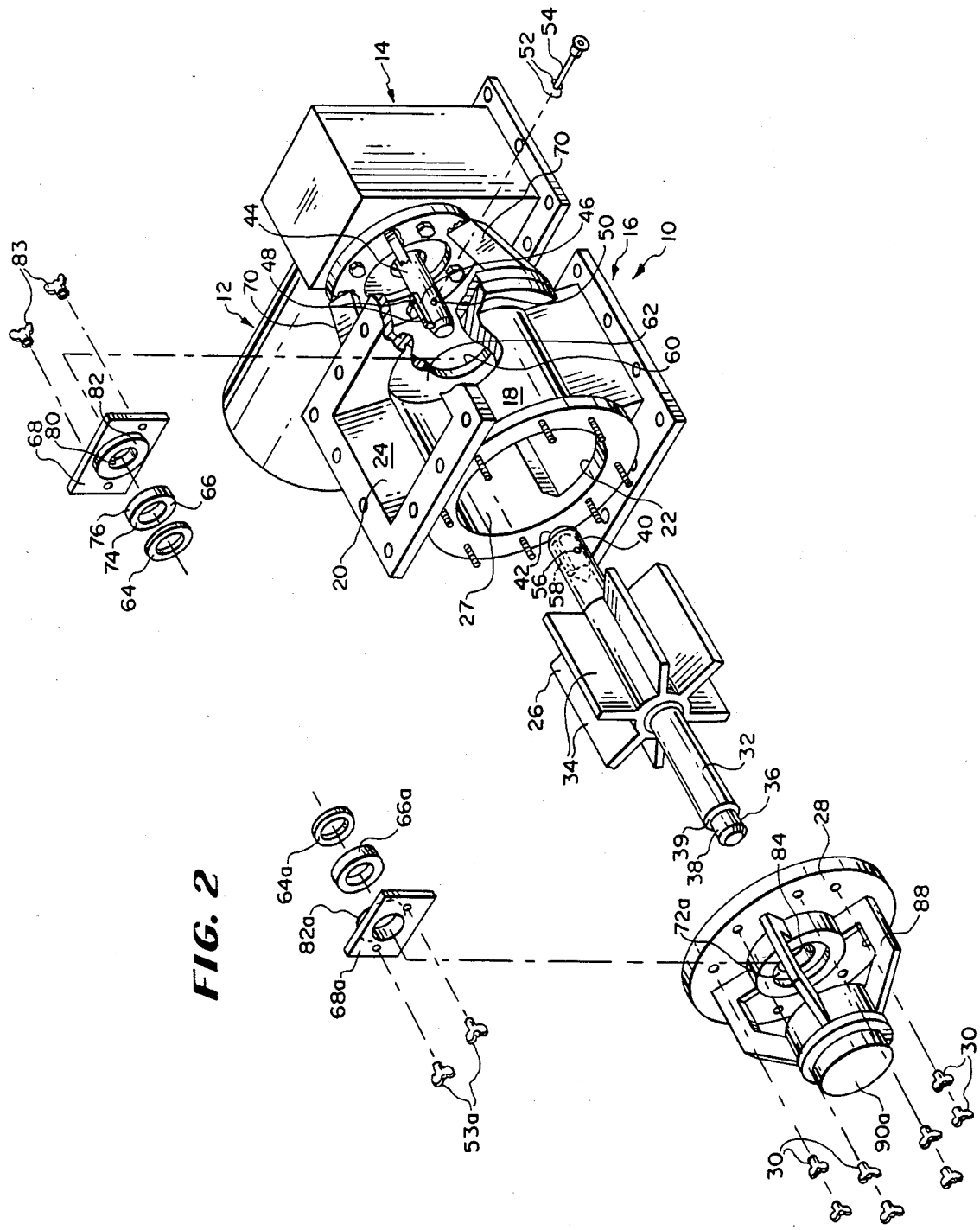
FIG. 2 is a partially cutaway, exploded view of the rotary feeder of FIG. 1.

Referring now to FIG. 2 also, there is better seen the rotor 26 comprising a rotor stem or shaft 32, and extending radially therefrom a plurality of rotor vanes or blades 34. As shown, the rotor 26 includes six blades 34 each spaced equidistant from adjacent blades 34. This rotor 26 is formed as a unitary component, all parts thereof being welded together, as opposed to bolting the separate parts to each other which would result in cracks and crevices at the joints and about the bolts in a component within the rotor housing 18 during use.

The forward end 36 of the rotor shaft 32 is formed as a length of shaft of decreased diameter or a coaxial shaft stem 38, and a shoulder 39 between the stem 38 and the rotor shaft proper 32.

From the rear end 40 of the rotor shaft 32 inward is formed with a bore 42 (shown in phantom in FIG. 2) which receives the end of a gear shaft 44 upon which is mounted an elongated strip or key 46. The key 46 is secured to the gear shaft 44 with a pair of set screws 48.

The gear shaft 44 is provided with an alignment bore 50 that extends from one side to the other of the gear shaft 44 and is formed to receive an alignment pin 54.

The rotor shaft 32 is provided with a pair of alignment bores 56 on opposite sides of the shaft bore 42 positioned so as to match the gear shaft alignment bore 50 when the rotor shaft 32 is so seated on the gear shaft 44 with respect to its axial line that the rotor blades 34 are properly positioned within the rotor housing 18 spaced apart from the housing forward and rear walls.

Near the tip of the alignment pin 54 are a set of spring-loaded ball pins 52 that retract as the alignment pin 54 is being inserted through, or retracted from, the alignment bores 50,56 of the gear shaft 44 and rotor shaft 32, and spring back to protruding position when such shafts 44,32 are spanned, to prevent accidental dislodgement of the alignment pin 54.

The alignment pin 54 is disposed outwards of the rotor housing 18 and thus does not contribute any crevices or the like to the surfaces in contact with the material going through the feed passage. Further, this pin 54 can be lodged or dislodged by hand when the rotor housing 18 is closed.

The gear shaft key 46 is fitted snugly within a groove 58 along the side of the shaft bore 46 and bears against the side of the groove 58 transmitting the torque from the gear shaft 44 to the rotor shaft 32.

The above described interconnection between the rotor shaft 32 and gear shaft 44 is positioned outwards of the rotor housing 18, the rotor shaft 32 projecting through an aperture 60 in the rear housing wall 62 which is sealed around the rotor shaft 32 by a sealing assembly comprising a washer 64, preferably formed of tetrafluoro-ethylene resin, a tetrafluoro-ethylene resin tipped seal 66, and retaining plate 68, which sealing assembly is discussed in detail below. A similar assembly seals the forward end 36 of the rotor shaft 32 and the aperture through which it extends out of the rotor housing 18.

Figure 3:
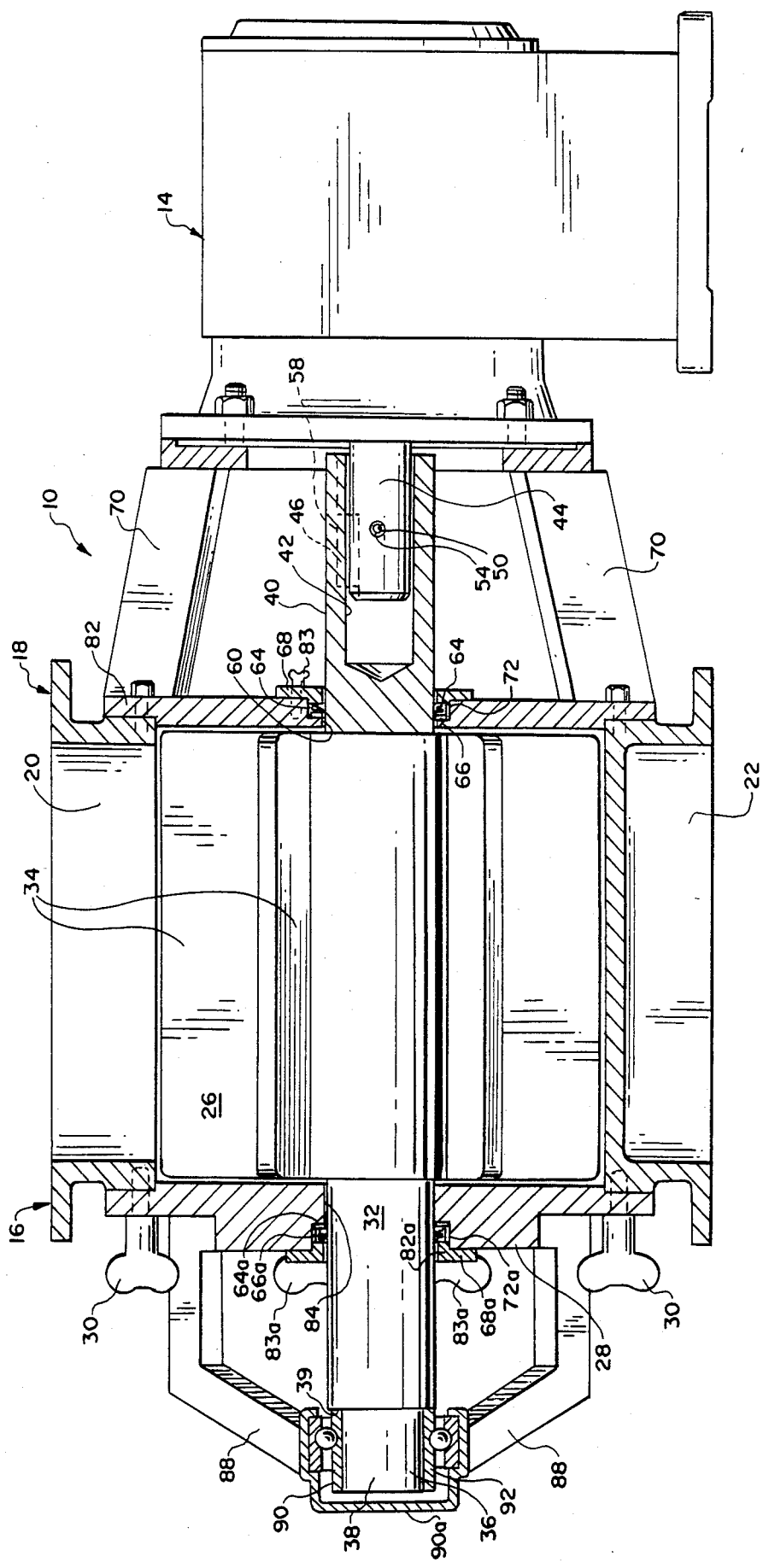
FIG. 3 is a section side view of the rotary feeder of FIG. 1 taken along line 3 of FIG. 1.

Referring now to FIG. 3 also, the rotary feeder 16 is interconnected to the gear box 14 by braces 70 which holds these units together in a predetermined spaced-apart relationship. The means for fastening the braces 70 to the feeder 16 do not protrude through its rear housing wall 62.

The aperture 60 in the rear housing wall 62 through which the rear end 40 of the rotor shaft 32 passes is formed to provide only minimal clearance for the rotor shaft 32 and the rear housing wall 62 is formed with an annular hollow 72 in its outer surface encircling the aperture 60, providing a seat for the sealing assembly. The sealing assembly, as mentioned briefly above, comprises first an annular gasket or washer 64 formed of tetrafluoro-ethylene resin which closely encircles the rotor shaft 32 and fits within the hollow 72 bearing against its bottom wall. Adjacent the washer 64 is the annular seal 66 comprising a metal ring 74 formed at its outer circumference with a forwardly extending flange 76 and at its inner circumference with an inner ring or tip 78 formed of tetrafluoro-ethylene resin. The seal 66 is positioned against the washer 64 with its flange 76 extending from its opposite face, towards the rotor housing 18. The inner ring or tip 78 is concave towards the rotor housing 18, encompassed by the ring formed by the outer flange 76. The seal 66 also is seated within the hollow 72.

Beyond the seal 66 is the retaining plate 68 having a center bore 80 encircled by an annular boss 82 which presses directly on the metal ring 74, pressing the flange 76 against the washer 64. This retaining plate 68 is secured to the rear housing wall 62 with wing nuts 83 or other suitable means for fastening that do not protrude through the rear housing wall 62.

The blades 34 of the rotor 26 span almost the entire distance between the inner surfaces of the rear housing wall 62 and the forward wall of the rotor housing 18, formed mainly by the front end plate 28, the clearance therebetween preferably being of the order of a few thousandths of an inch. Thus proper placement of the rotor 26 along its axial line thus is of great importance.

The front end plate 28 is formed with a center aperture 84 through which the forward end 36 of the rotor shaft 32 projects beyond the shaft stem portion 38 and the shoulder 39. The forward end plate 28 on its outer surface is formed with an annular hollow 72a encircling the center aperture 84 and receiving a washer 64a, tipped seal 66a, and an annular boss 82a of a retaining plate 68a forming a sealing assembly as described above for the shaft aperture 60 of the rear housing wall 62. This retaining plate 68a is similarly secured to the front end plate 28 by a pair of wing nuts 83a or other means that do not protrude through to the inner surface of the forward end plate 28.

The end plate 28 further includes a bearing cartridge 90 and cap 90a held in spaced apart relationship from the retaining plate 68a by a plurality of arms or braces 88. Such cap 90 is held opens towards, and in axial alignment with, the end plate aperture 84, and thus also with the center bore 80a of the retaining plate 68a when mounted on the end plate 28. Within such cartridge 90 is fitted a ball bearing 92 for the stem portion 38 of the forward end 36 of the rotor shaft 32. The shoulder 39 of the rotor shaft 32 will be positioned outside of, and adjacent to, the bearing 92.

To disassemble the rotary feeder 16 for the purpose of cleaning the interior of the rotor housing 18, one merely unfastens the wing nuts 30 securing the end plate 28 to the rotor housing 18, and removes the end plate 28 together with its sealing assembly, leaving the rotor shaft 32 free at its forward end 36. Then the alignment pin 54, lodged through the rotor shaft 32 and gear shaft 44 at a position between the housing rear wall 62 and gear box 14, is removed, freeing the rotor 26 which then is pulled forward, out of the rotor housing 18 and off the gear shaft 44. The sealing assemblies, i.e., the retaining plates 68, 68a, the seals 66, 66a, and washers 64, 64a, can be removed from the rear housing wall 62 and end plate 28 for cleaning.

Reassembly of the feeder 16 merely requires the reverse of the disassembly steps, the rotor 26 being repositioned without resetting tolerances by virtue of the precise alignment determined by the placement of the alignment pin 54.

Referring now in particular to FIG. 3a, there is shown the rotor shaft 32 at the point of exit through the rear housing wall 62 through the aperture 60 therein. About the aperture 60 is formed the hollow 72 in which is seated first the washer 64 followed by the seal 66 which can be considered as comprising a first ring 74, preferably formed of metal, and a flange 76 extending from the outer circumference of the first ring 74, that bears against the washer 64, a second inner ring or tip 78 that extends inwardly beyond the inner circumference of the first ring 74. The second ring 78, is preferably formed of tetrafluoro-ethylene resin is somewhat resilient and seals the rotor shaft 32.

INDUSTRIAL APPLICABILITY OF THE INVENTION

The present invention and its various embodiments and features are applicable to the material handling industries including without limitation the food processing, chemical, and pharmaceutical industries.

I claim:

1. A rotary feeder system including,
   a rotor housing having an intake opening and means for discharging material therefrom;
   said rotor housing having a first and a second side wall, said side walls being disposed in spaced-apart relationship and each having an aperture;
   a rotor comprising a rotor shaft having a first and a second end and a plurality of blades, said blades being mounted on said rotor shaft inwards of said first and second ends and extending radially from said rotor shaft, said rotor being disposed with said blades within said rotor housing, said first end of said rotor shaft extending through said aperture in said first side wall, and said second end of said rotor shaft extending through said aperture in said second side wall;
   means for rotating said rotor, said rotating means being interconnected to said first end of said rotor shaft and being disposed outwards of said rotor housing;
   means for supporting said rotor while rotating, said supporting means bearing against said second end of said rotor shaft and being disposed outwards of said rotor housing; the improvement comprising:
   means for sealing said apertures in said first and second side walls comprising at each aperture a washer bearing against the outer surface of the respective side wall, a seal having a first and a second ring interconnected in bevelled relationship, said first ring forming a flange which presses against said washer and said second ring extending inwards beyond the inner circumference of said first ring and inclined toward said washer, and means for retaining said seal in bearing relationship with said washer, wherein each of said washer, seal and retaining means encircle said rotor shaft, and wherein said rotary housing, said side walls and said rotor are made of cast material and all joints between said rotary housing and one of said side walls of said rotor housing are welded to fill all crevices.

2. The rotary feed system of claim 1 wherein said rotating means includes a gear shaft having a bore extending therethrough and said first end of said rotor shaft receives said gear shaft in coaxial alignment and has a bore positioned to coincide with said gear shaft bore, and further including means to transmit torque from said gear shaft to said rotor shaft and an elongated pin extending through said bores in said gear and rotor shaft.

3. The rotary feeder system of claim 2 wherein said second side wall of said rotor housing comprises a plate removable from the remainder of said rotor housing.

4. The rotary feeder system of claim 3 wherein said first and second side walls each include a bore formed by cylindrical walls in said side walls and a bottom encircling said apertures and said washers and seals are seated within said bores.

5. The rotary feeder system of claim 4 wherein said retaining means comprises a retaining plate having an aperture encircled by an annular boss, wherein said boss bears against said second ring of said seal.

6. The rotary feeder system of claim 5 wherein said washers and said second rings of said seals are formed of tetrafluoro-ethylene resin.

7. A rotary feeder system including:
   a rotor housing having an intake opening and means for discharging material therefrom;
   said rotor housing having a first and a second side wall, said side walls being disposed in spaced-apart relationship and each having an aperture;
   a rotor comprising a rotor shaft having a first and second end and a plurality of blades, said blades being mounted on said rotor shaft inwards of said first and second ends and extending radially from said rotor shaft, said rotor being disposed with said blades within said rotor housing, said first end of said rotor shaft extending through said aperture in said first side wall, and said second end of said rotor shaft extending through said aperture in said second side wall;
   means for rotating said rotor, said rotating means being interconnected to said first end of said rotor shaft and being disposed outwards of said rotor housing;
   means for support of said rotor while rotating, said supporting means bearing against said end of said rotor shaft and being disposed outwards of said rotor housing; the improvement comprising:
   means for sealing said apertures in said first and second side walls comprising at each aperture a washer bearing against the outer surface of the respective side wall, a seal having a first and a second ring interconnected in bevelled relationship, said first ring being rigid and forming a flange which presses against said washer and said second ring being resilient and extending inwards beyond the circumference of said first ring;
   said first and second side walls each including a bore formed by cylindrical walls in said side walls and a bottom, encircling said apertures and said washers and seals are seated within said bores;
   manually removable and replaceable means for retaining said seal in bearing relationship with said washer, wherein said retaining means comprises a retaining plate having an aperture and encircled by an annular boss, wherein said boss bears against said second ring of said seal, and wherein each of said washer, seal and retaining means encircles said rotor shaft;
   said outwardly disposed rotor support means being disposed to provide clearance for manual removal and replacement of said washer, seal and retaining means.

8. The rotary feed system of claim 7 wherein said rotor housing, said side walls and said rotor are made of cast material and all joints between said rotor housing and said side walls of said rotor housing are welded to fill all crevices.

9. The rotary feed system of claim 7 wherein said rotating means include a gear shaft having a bore extending therethrough and said first end of said rotor shaft receives said gear shaft in coaxial alignment and has a bore position to go inside with said gear shaft bore, and further including means to transmit torque from said gear shaft to said rotor shaft and elongated, manually removable and replaceable, pin extending through said bores in said gear and rotor shaft.

10. The rotary feeder system of claim 9 wherein said second side wall of said rotor housing comprises a plate removable from the remainder of said rotor housing.

11. The rotary feeder system of claim 7 wherein said washers and said rings are made of tetrafluoroethylene resin (Teflon).

* * * * *